United States Patent
Wilson et al.

(10) Patent No.: US 11,741,843 B2
(45) Date of Patent: Aug. 29, 2023

(54) SYSTEMS AND METHODS OF RADAR SURVEILLANCE ON-BOARD AN AUTONOMOUS OR REMOTELY PILOTED AIRCRAFT

(71) Applicant: The Boeing Company, Chicago, IL (US)

(72) Inventors: Ian A. Wilson, Chicago, IL (US); Samet M. Ayhan, Chicago, IL (US)

(73) Assignee: The Boeing Company, Chicago, IL (US)

( * ) Notice: Subject to any disclaimer, the term of this patent is extended or adjusted under 35 U.S.C. 154(b) by 540 days.

(21) Appl. No.: 16/839,241

(22) Filed: Apr. 3, 2020

(65) Prior Publication Data

US 2023/0230489 A1 Jul. 20, 2023

(51) Int. Cl.
| | | |
|---|---|---|
| G08G 5/00 | (2006.01) | |
| B64C 39/02 | (2023.01) | |
| G08G 5/02 | (2006.01) | |
| G08G 5/04 | (2006.01) | |
| G01S 13/89 | (2006.01) | |
| G01S 13/90 | (2006.01) | |

(52) U.S. Cl.
CPC ............ *G08G 5/0078* (2013.01); *B64C 39/024* (2013.01); *G01S 13/89* (2013.01); *G01S 13/9004* (2019.05); *G08G 5/02* (2013.01); *G08G 5/0021* (2013.01); *G08G 5/045* (2013.01); *G08G 5/0065* (2013.01); *G08G 5/0069* (2013.01); *B64U 2201/10* (2023.01)

(58) Field of Classification Search
CPC .... B64C 39/024; G01S 13/89; G01S 13/9004; G08G 5/0021; G08G 5/0065; G08G 5/0069; G08G 5/02; G08G 5/045; B64C 2201/141; G01S 13/931; B64U 2201/10; G08G 5/0078; G01S 3/933
See application file for complete search history.

(56) References Cited

U.S. PATENT DOCUMENTS

| | | | | |
|---|---|---|---|---|
| 5,317,320 A | * | 5/1994 | Grover et al. ........... | G01S 7/02 342/119 |
| 5,448,243 A | * | 9/1995 | Bethke et al. ......... | G01S 13/87 342/36 |
| 8,630,755 B2 | * | 1/2014 | Ohtomo et al. ........ | G01S 19/15 701/16 |
| 10,204,269 B2 | * | 2/2019 | Schultz et al. ....... | B64C 39/024 |
| 11,189,922 B2 | * | 11/2021 | Tran et al. ............. | G06N 20/10 |

(Continued)

FOREIGN PATENT DOCUMENTS

WO  2013141922 A2 * 9/2013 .................. G01C 21/00

OTHER PUBLICATIONS

Extended European Search Report prepared by the European Patent Office in application No. 21 166 620.1 dated Aug. 4, 2021.

(Continued)

*Primary Examiner* — Nuzhat Pervin
(74) *Attorney, Agent, or Firm* — McDonnell Boehnen Hulbert & Berghoff LLP (57) ABSTRACT

An example autonomous or remotely piloted aircraft includes a virtual aperture radar system including a plurality of antennas relationally positioned on one or more surfaces of the aircraft such that individual beams from each of the plurality of antennas scan respective volumes around the aircraft and the respective volumes together substantially form an ellipsoidal field of regard around the aircraft, and a computing device having one or more processors configured to execute instructions stored in memory for performing functions of: combining the respective volumes together to form an image representative of the ellipsoidal field of regard around the aircraft, and identifying one or more objects within the image.

20 Claims, 4 Drawing Sheets

(56) References Cited

U.S. PATENT DOCUMENTS

| | | | | |
|---|---|---|---|---|
| 2008/0169962 | A1* | 7/2008 | Rees et al. | H01Q 21/064 |
| | | | | 342/29 |
| 2010/0087967 | A1* | 4/2010 | Meyers et al. | G01S 13/42 |
| | | | | 701/25 |
| 2011/0267222 | A1* | 11/2011 | Craig | G01S 3/04 |
| | | | | 342/28 |
| 2012/0092208 | A1* | 4/2012 | LeMire et al. | G01S 13/87 |
| | | | | 342/29 |
| 2014/0368378 | A1* | 12/2014 | Crain et al. | G01S 13/88 |
| | | | | 342/25 A |
| 2017/0285158 | A1* | 10/2017 | Halbert et al. | G01S 7/414 |
| 2017/0343667 | A1* | 11/2017 | Vacanti et al. | G01S 7/032 |
| 2018/0068186 | A1* | 3/2018 | Schultz et al. | G05D 1/0094 |
| 2018/0068187 | A1* | 3/2018 | Schultz et al. | H04N 21/4316 |
| 2018/0357477 | A1* | 12/2018 | Schultz et al. | G08G 5/0069 |
| 2019/0198985 | A1* | 6/2019 | Seler et al. | H01Q 21/205 |
| 2019/0324134 | A1* | 10/2019 | Cattle | G01S 7/032 |
| 2019/0346562 | A1* | 11/2019 | Peng et al. | G01S 13/86 |
| 2020/0159252 | A1* | 5/2020 | Giuffrida et al. | H04N 7/185 |
| 2020/0341493 | A1* | 10/2020 | Sabato | G01S 13/9029 |
| 2021/0407306 | A1* | 12/2021 | Nielsen et al. | G01S 13/935 |
| 2022/0260697 | A1* | 8/2022 | Saitto | G01S 13/32 |

OTHER PUBLICATIONS

Moses, Allistair A., "RADAR Based Collision Avoidance for Unmanned Aircraft Systems" (2013) (Year: 2013).*

* cited by examiner

SYSTEMS AND METHODS OF RADAR SURVEILLANCE ON-BOARD AN AUTONOMOUS OR REMOTELY PILOTED AIRCRAFT

FIELD

The present disclosure relates generally to systems and methods for radar surveillance on-board an autonomous or remotely piloted aircraft, and more particularly to combining scanned volumes around the aircraft using a virtual aperture radar system to form an image representative of an ellipsoidal field of regard around the aircraft.

BACKGROUND

Unmanned Aircraft Systems (UAS), pilotless Urban Air Mobility (UAM) vehicles, Unmanned Aerial Vehicles (UAV), and Cargo Air Vehicles (CAV) are all expected to become ubiquitous worldwide. Although these vehicles are often considered Remotely Piloted Aircraft Systems (RPAS), there is a possibility that they can lose their control link to the remote pilot. For this reason, these aircraft should also be designed as autonomous so that they are capable of safe operations if they lose their communications link to their remote pilot, if any.

For autonomous operation, UAS have to detect and avoid aircraft nearby including aircraft that are not radiating any information electronically about their position (and sometimes referred to as non-cooperative aircraft, that is, aircraft that are not radiating any information electronically about their position and cannot be sensed by Automatic Dependent Surveillance Broadcast-IN (ADS-B-IN) systems, or Traffic Collision Avoidance Systems (TCAS) (e.g., no radio beacon in use). In contrast, a cooperative aircraft is an aircraft that is transmitting a radar and/or radio beacon (e.g., ADS-B signal), and such active broadcast can be received by other aircraft in the vicinity allowing tracking and avoidance, if necessary.

Systems exist for aircraft that feed much surveillance information to the aircraft for on board computer systems to utilize. However, these systems rely on communications to the aircraft, which as stated, can fail. Therefore, external sources of Detect and Avoid (DAA) are of no use to the UAS/UAM/CAVs aircraft if the communications link is inoperable or lost. Thus, the loss of link for a UAS, UAM, or CAVs means that any remote sensors or DAA capability is also likely lost.

SUMMARY

In an example, an autonomous or remotely piloted aircraft is described comprising a virtual aperture radar system including a plurality of antennas relationally positioned on one or more surfaces of the aircraft such that individual beams from each of the plurality of antennas scan respective volumes around the aircraft, and the respective volumes together substantially form an ellipsoidal field of regard around the aircraft. The aircraft also comprises a computing device having one or more processors configured to execute instructions stored in memory for performing functions of combining the respective volumes together to form an image representative of the ellipsoidal field of regard around the aircraft, and identifying one or more objects within the image.

In another example, a method of radar surveillance on-board an autonomous or remotely piloted aircraft is described. The method comprises electronically scanning respective volumes around the aircraft using a virtual aperture radar system including a plurality of antennas relationally positioned on one or more surfaces of the aircraft such that individual beams from each of the plurality of antennas scan the respective volumes around the aircraft, and the respective volumes together substantially form an ellipsoidal field of regard around the aircraft. The method also comprises combining, by a computing device, the respective volumes together to form an image representative of the ellipsoidal field of regard around the aircraft, and identifying, by the computing device, one or more objects within the image.

In another example, a non-transitory computer-readable media is described having stored therein executable instructions, which when executed by a computing device having one or more processors causes the computing device to perform functions. The functions comprise causing a plurality of antennas relationally positioned on one or more surfaces of an aircraft to electronically scan respective volumes around the aircraft such that individual beams from each of the plurality of antennas scan the respective volumes around the aircraft, and the respective volumes together substantially form an ellipsoidal field of regard around the aircraft. The functions also comprise combining the respective volumes together to form an image representative of the ellipsoidal field of regard around the aircraft, and identifying one or more objects within the image.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

With the possibility for a UAS or UAM to lose their control link to the remote pilot, these aircraft should also be designed as autonomous so that they are capable of safe operations if they lose their communications link to their remote pilot, if any. For autonomous operation, UAS have to detect and avoid aircraft nearby including aircraft. Non-cooperative aircraft can generally only be sensed by active primary radar on the UAS, and non-cooperative aircraft are mainly found in airspace between the surface and 10,000 feet, which is also the airspace that many UAS and UAM aircraft are expected to operate. Therefore, UAS and UAM should also designed to be able to detect other aircraft objects and potentially birds using an independent internal capability.

Within examples herein, ellipsoidal radar coverage is provided surrounding the UAS by positioning multiple radar antennas on surfaces of the UAS. All of the antennas can be operated to scan different areas resulting in multiple scanned regions, which can then be stitched together to from the ellipsoidal radar coverage. This enables a UAS or UAM vehicle to have radar coverage vertically above and below the aircraft for landing and taking off.

By using a radar with an oblate-spheroid/ellipsoid field of regard detection capability, the aircraft will be able to operate safely beyond visual line of sight (BVLOS) without a need for remote visual observers.

Within further examples herein, a distributed aperture radar is provided using a low size weight and power (SWaP) conformal or flat antenna such that a field of regard equivalent to an oblate-spheroid with a vertical axis of about 8000 feet and a range of 10 miles or less centered on the UAS can be generated. Any aircraft detected within that FOR can then be tracked by. Other dimensions of the oblate-spheroid/ellipsoid can be implemented and may depend on expected operations of the aircraft (e.g., a small UAS operating mainly in towns at low speed may not need 10 nautical mile range or 4000 feet above and below so these distances may be smaller), however a shape can remain an oblate spheroid providing warning of conflicting aircraft and obstacles to the aircraft and the pilot in command, if present.

Figure 1:
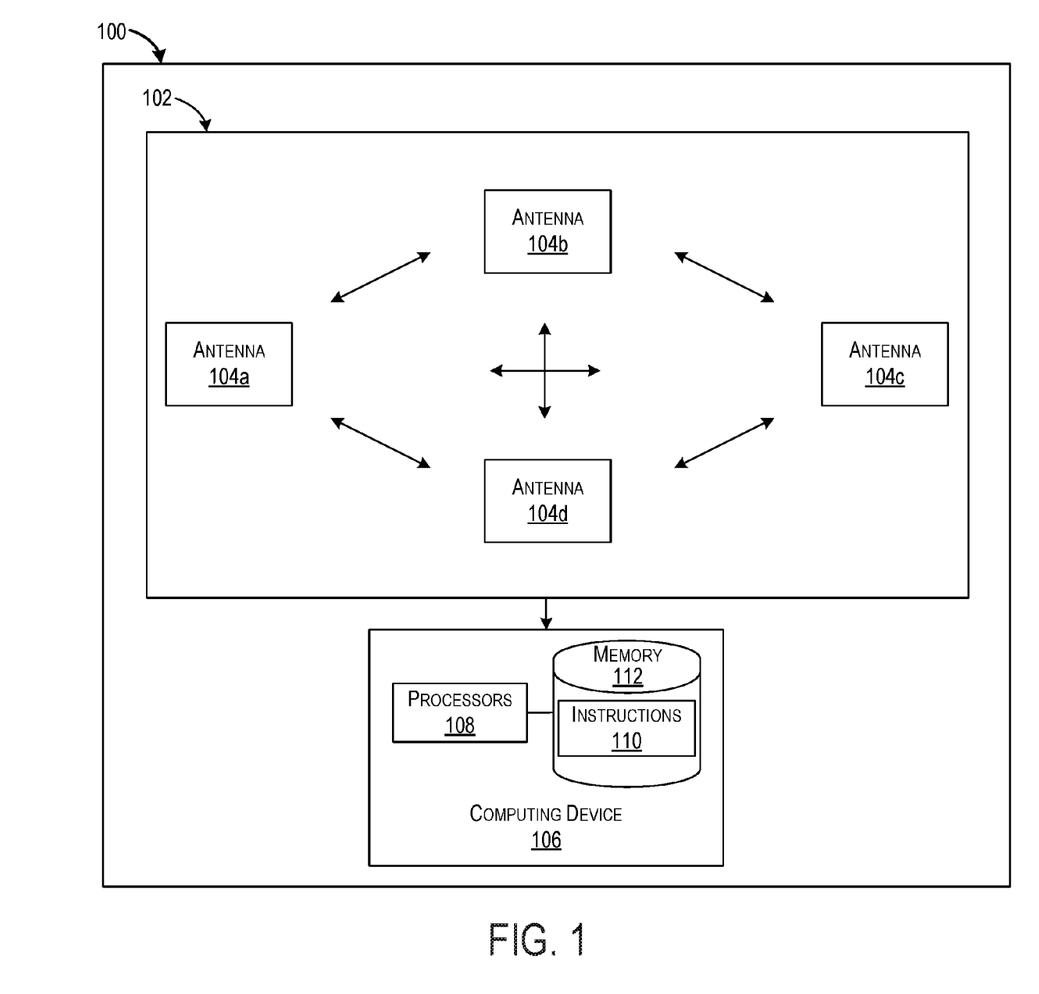
FIG. 1 illustrates an autonomous or remotely piloted aircraft, according to an example implementation.

Referring now to the figures, FIG. 1 illustrates an autonomous or remotely piloted aircraft 100, according to an example implementation. The aircraft 100 includes a virtual aperture radar system 102 including a plurality of antennas 104a-d relationally positioned on one or more surfaces of the aircraft 100 such that individual beams from each of the plurality of antennas 104a-d scan respective volumes around the aircraft 100, and the respective volumes together substantially form an ellipsoidal field of regard around the aircraft 100. The aircraft also includes a computing device 106 having one or more processors 108 configured to execute instructions 110 stored in memory 112 for performing functions of combining the respective volumes together to form an image representative of the ellipsoidal field of regard around the aircraft 100, and identifying one or more objects within the image.

The autonomous or remotely piloted aircraft 100 can take many forms (an example is described below and shown in FIG. 2). The autonomous or remotely piloted aircraft 100 may be any type of UAM, UAS, CAV, or similar. The aircraft 100 is one that is capable of vertical takeoff and landing, for example. The aircraft 100 can include multiple rotors, multiple engines, wings and other structural components needed for flying. As described below, the one or more processors 108 are further configured to execute the instructions 110 stored in memory 112 for performing a function of autonomously controlling operation of the aircraft 100 based on the one or more objects identified within the image. In another example, the one or more processors 108 are further configured to execute the instructions 110 stored in memory 112 for performing a function of autonomously controlling operation of the aircraft 100 during a vertical descent to land and during a vertical takeoff based on analysis of airspace below and above the aircraft 100 using the image representative of the ellipsoidal field of regard around the aircraft 100.

The virtual aperture radar system 102 includes the plurality of antennas 104a-d. The plurality of antennas 104a-d are positioned on different areas of a surface of the aircraft 100. By positioning the plurality of antennas 104a-d relationally to each other, the ellipsoidal field of regard can be generated. The relational positioning may include being positioned at centers of faces of a conceptual rectangle in which the aircraft 100 is positioned at a center. Another example relational positioning includes antenna 104a on a forward surface, antenna 104b on a top surface, antenna 104c on a rear surface, and antenna 104d on a bottom surface. Another example relational positioning includes antenna 104a at a center on a forward surface, antenna 104b at a center on a top surface, antenna 104c at a center on a rear surface, and antenna 104d at a center on a bottom surface.

Each of the plurality of antennas 104a-d may be configured to scan a different area surrounding the aircraft 100, with some areas overlapping, for example. In addition, each of the plurality of antennas 104a-d are configured to scan at the same time and provide outputs to the computing device 106. The plurality of antennas 104a-d may also be configured to continuously scan the areas as long as the aircraft 100 is in operation, and outputs of the plurality of antennas 104a-d can be time and location stamped to enable the computing device 106 to stitch together all the scans.

The computing device 106 may take many forms, and has the one or more processors 108 configured to execute the instructions 110 stored in the memory 112 for performing functions described herein. The computer device 106 may include many other components, such as a communication interface (e.g., wireless interface and/or one or more wireline interfaces that allow for both short-range communication and long-range communication to one or more networks or to one or more remote devices) and an output interface (e.g., outputs information for reporting or storage, and thus, the output interface may be similar to the communication interface and can be a wireless interface (e.g., transmitter) or a wired interface as well), as well as include hardware to enable communication within the computing device 106 and between the computing device 106 and other devices (not shown). The hardware may include transmitters, receivers, and antennas, for example.

The memory 112 may be non-transitory computer readable media that takes the form of computer-readable storage media that can be read or accessed by the one or more processors 108. The computer-readable storage media can include volatile and/or non-volatile storage components, such as optical, magnetic, organic or other memory or disc storage, which can be integrated in whole or in part with the one or more processors 108. The memory 112 is considered non-transitory computer readable media. In some examples, non-transitory computer readable media can be implemented using a single physical device (e.g., one optical, magnetic, organic or other memory or disc storage unit), while in other examples, non-transitory computer readable media can be implemented using two or more physical devices.

The memory is thus non-transitory computer readable media, and the instructions 110 are stored thereon. The instructions 110 include computer executable code.

The one or more processors 108 may be general-purpose processors or special purpose processors (e.g., digital signal processors, application specific integrated circuits, etc.). The one or more processors 108 may receive inputs from an input interface (e.g., the communication interface), and processes them to generate outputs that are stored in the memory 112. The one or more processors 108 can be configured to execute the instructions 110 (e.g., computer-readable program instructions) that are stored in the memory 112 and are executable to provide the functionality of the computing device 106 described herein.

Figure 2:
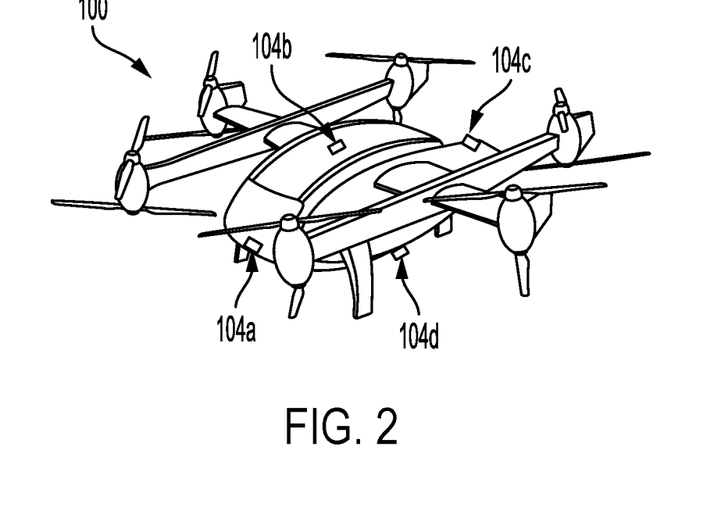
FIG. 2 is an illustration of an example of the aircraft, according to an example implementation.

FIG. 2 is an illustration of an example of the aircraft 100, according to an example implementation. The aircraft 100 is capable of vertical takeoff and landing, and in this example, includes six rotors on separate wings. The plurality of antennas 104*a-d* are shown mounted and positioned on surface(s) of the aircraft 100. In this example, the plurality of antennas 104*a-b* includes at least four radar antennas, and a first radar antenna 104*d* is positioned to face downward on the aircraft 100, a second radar antenna 104*b* is positioned to face upward on the aircraft 100, a third radar antenna 104*a* is positioned to face forward on the aircraft 100, and a fourth radar antenna 104*c* is positioned to face rearward on the aircraft 100.

Positions of the plurality of antenna 104*a-d* on the aircraft 100 can vary based on a type of the aircraft, and also based on a type of the antenna. In addition, although four antennas are shown, the aircraft 100 may include more or fewer antennas. In one example, the aircraft 100 may include six antennas to cover additional blind spots. A minimum number of radar antenna to provide an ellipsoidal field of regard around the aircraft thus varies and is determined by a shape and geometry of the aircraft 100, and where the radar antennae can be mounted.

The plurality of antennas 104*a-b* have fixed positions on the one or more surfaces of the aircraft 100, and the plurality of antennas 104*a-d* are configured to electronically scan the respective volumes. Thus, the plurality of antennas 104*a-d* may have no moving parts, for example. In some examples, at least some of the plurality of antennas 104*a-d* include low Size Weight and Power (SWaP) antennas. In other examples, at least some of the plurality of antennas 104*a-d* include conformal or flat antennas. One of the issues with small normally electrically powered vehicles is Low Size Weight and Power (SWaP) systems. However, radar antennae are routinely flat or conformal with electronic scanning so that there are no moving parts.

Figures 3, 4:
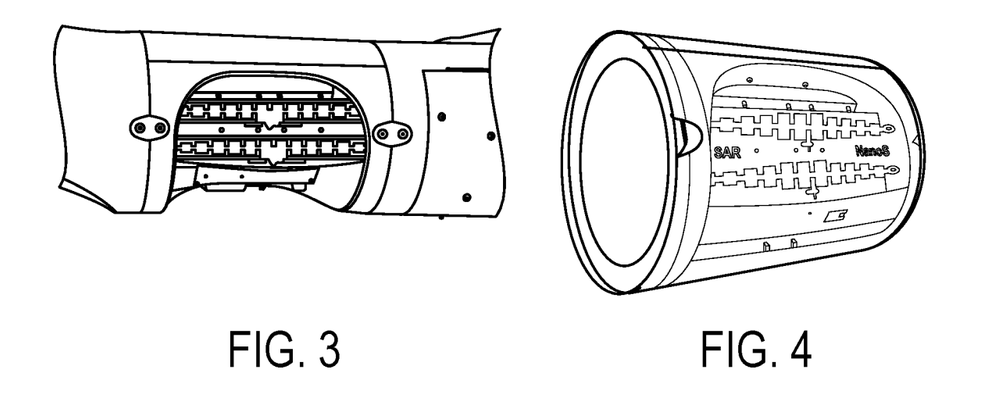
FIG. 3 illustrates an example type of antenna for the plurality of antennas, according to an example implementation.
FIG. 4 illustrates another example type of antenna for the plurality of antennas, according to an example implementation.
Figure 5:
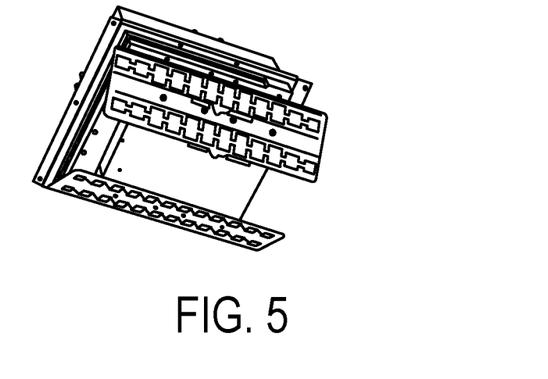
FIG. 5 illustrates another example type of antenna for the plurality of antennas, according to an example implementation.

FIGS. 3-5 illustrate example types of antenna for the plurality of antennas 104*a-d*, according to example implementations. In FIG. 3, at least one of the plurality of antennas 104*a-d* is a synthetic aperture radar style antenna fitted into a portion of a surface of the aircraft 100. In FIG. 4, at least one of the plurality of antennas 104*a-d* is a synthetic aperture radar antenna fitted into another surface of a portion of the aircraft 100. In FIG. 5, at least one of the plurality of antennas 104*a-d* is a synthetic aperture radar antenna configured as a flat plate antenna.

Small conformal or flat antennas can be mounted on surfaces of the aircraft 100 at optimal positions considering form drag, weight and potential damage. A beam from the plurality of antennas 104*a-d* will scan volumes that abut or overlap to form a full ellipsoidal coverage.

Figure 6:
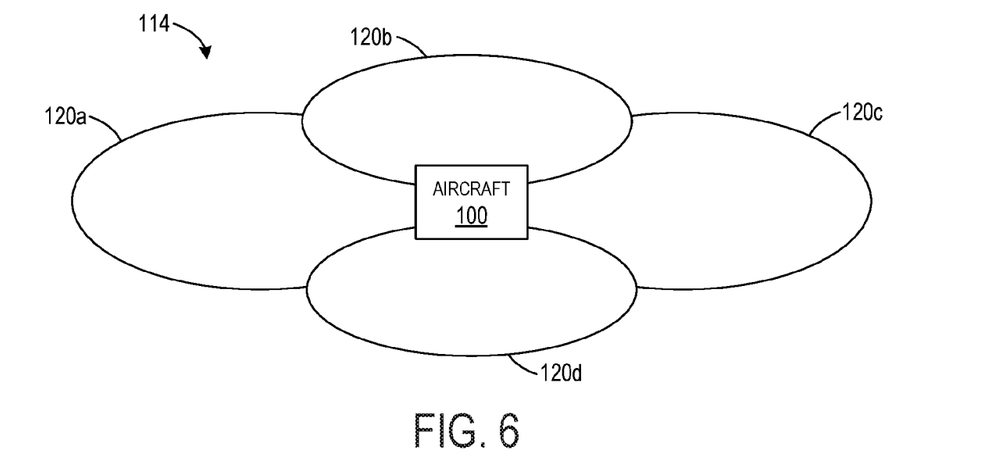
FIG. 6 illustrates a conceptual view of an ellipsoidal field of regard around the aircraft, according to an example implementation.

FIG. 6 illustrates a conceptual view of an ellipsoidal field of regard 114 around the aircraft 100, according to an example implementation. In FIG. 6, the plurality of antennas 104*a-d* provide respective individual beams 120*a-d* by scanning respective volumes around the aircraft 100. The respective volumes from the respective individual beams 120*a-d* together substantially form the ellipsoidal field of regard 114 around the aircraft 100. Some of the individual beams 120*a-d* may overlap depending on positioning of the plurality of antennas 104*a-d*, for example. The plurality of antennas 104*a-d* provide the ellipsoidal field of regard 114 coverage area by each scanning different areas around the aircraft 100, and then the individual beams 120*a-d* are stitched together, for example.

Figure 7:
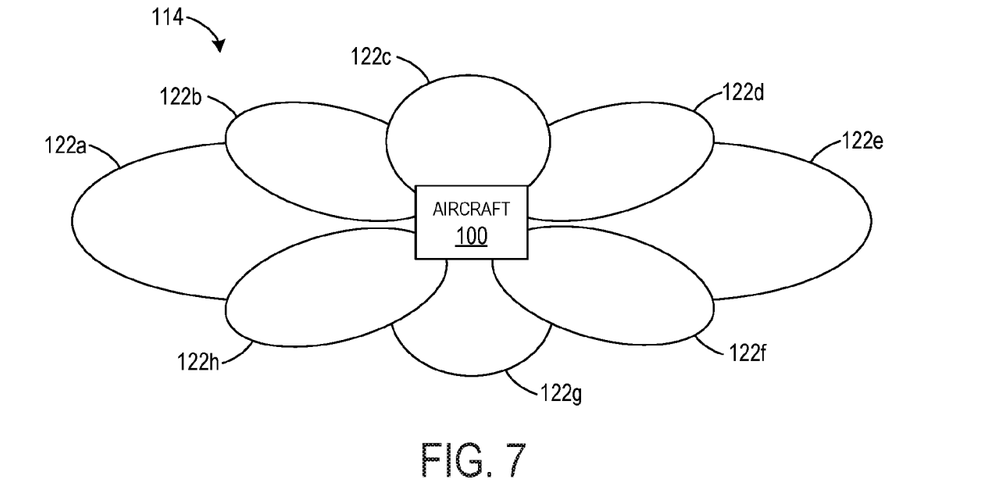
FIG. 7 illustrates another conceptual view of the ellipsoidal field of regard around the aircraft, according to an example implementation.

FIG. 7 illustrates another conceptual view of the ellipsoidal field of regard 114 around the aircraft 100, according to an example implementation. In FIG. 7, the aircraft 100 includes eight antennas, and each provide respective individual beams 122*a-h* by scanning respective volumes around the aircraft 100. The respective volumes from the respective individual beams 122*a-h* together substantially form the ellipsoidal field of regard 114 around the aircraft 100. Some of the individual beams 122*a-h* may overlap depending on positioning of the plurality of antennas, for example.

The aircraft 100 may include more or fewer antennas than shown and described with respect to FIGS. 6 and 7, and thus, more or fewer individual beams are provided. Within examples herein, relational positioning of the antenna on the aircraft 100 (no matter how many are included) results in individual beams that together substantially form the ellipsoidal field of regard 114 around the aircraft 100.

Figure 8:
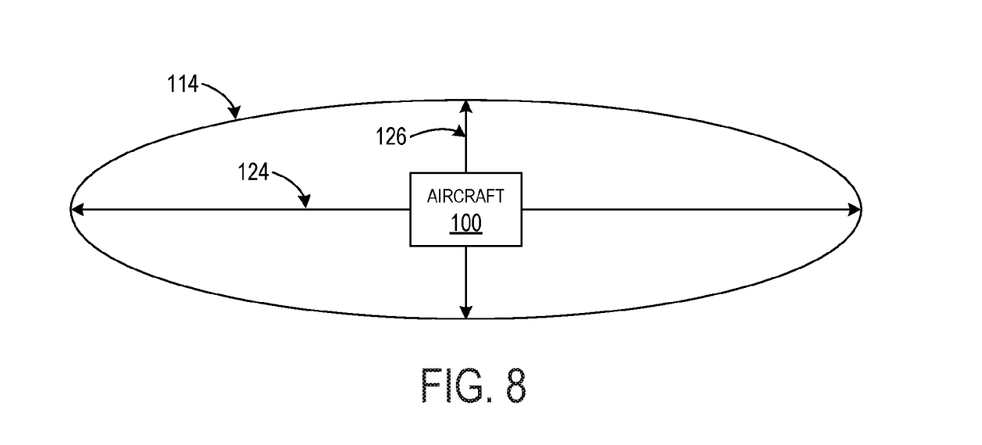
FIG. 8 illustrates another conceptual view of the ellipsoidal field of regard around the aircraft, according to an example implementation.

FIG. 8 illustrates another conceptual view of the ellipsoidal field of regard 114 around the aircraft 100, according to an example implementation. In FIG. 8, the individual beams from the plurality of antennas are not shown, and a conceptual shape of a coverage area of the ellipsoidal field of regard 114 is shown. Within examples, the aircraft 100 is at a center of the ellipsoidal field of regard 114, and a horizontal diameter 124 of the ellipsoidal field of regard 114 is larger than a vertical diameter 126 of the ellipsoidal field of regard 114. In some examples, the ellipsoidal field of regard 114 provides a coverage area including the vertical diameter 126 of at least 4000 feet and the horizontal diameter 124 having a range of at least 5 nautical miles centered on the aircraft 100. Other dimensions are possible too (e.g., vertical diameter of 8000 feet and horizontal diameter of between 5-20 nm) depending on a number, positioning, type, and size of the antenna on the aircraft 100, for example.

In FIG. 8, the ellipsoidal field of regard 114 is an oblate-spheroid coverage area around the aircraft 100, which may be an UAS, UAM or CAVs vehicle capable of VSTOL which may be piloted, remotely piloted or autonomous and may carry passengers. FIG. 8 may not be to scale. It will usually be the case that the aircraft 100 will need longer range in the horizontal axis due to speed of both the aircraft 100 and conflicting aircraft, and the horizontal separation standard requirements, than for vertical axis as descent rates are usually slower than forward speed. It is possible that an extent of the radar coverage could be configurable to save power dependent on a current operation. For example, a UAM drone setting down passengers at an urban landing site may need its vertical axis reduced to perhaps 500 feet above and 100 feet below and the horizontal axis reduced to as little as 500 feet during descent. However, the same aircraft in cruise at 3,000 feet and 250 knots may need to have significant situational awareness that would be provided by a radar with greater horizontal range, such as perhaps 10 nm or more. Thus, power provided to the plurality of antennas 104a-d may be modified based on operation of the aircraft 100 so as to increase, decrease, or change a size of the resulting ellipsoidal field of regard 114. A larger amount of power provided to the plurality of antennas 104a-d can result in larger individual beams and a larger size of the ellipsoidal field of regard 114. In contrast, a smaller amount of power provided to the plurality of antennas 104a-d can result in smaller individual beams and a smaller size of the ellipsoidal field of regard 114.

Figure 9:
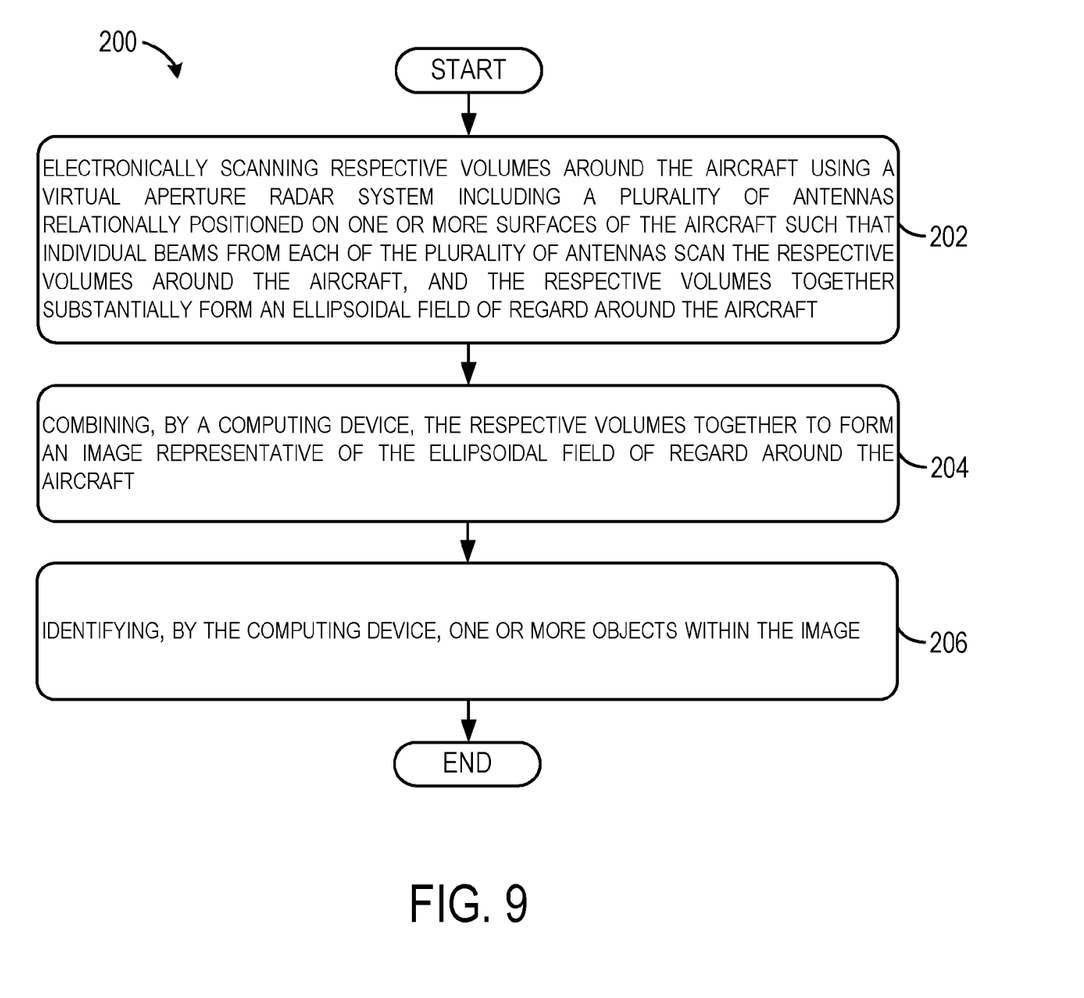
FIG. 9 illustrates an example method of radar surveillance on-board an autonomous or remotely piloted aircraft, according to an example implementation.

FIG. 9 illustrates an example method 200 of radar surveillance on-board an autonomous or remotely piloted aircraft 100, according to an example implementation. The method shown in FIG. 9 presents an example of a method that could be used with the aircraft 100 shown in FIG. 1, or with the computing device 106 shown in FIG. 1, for example. Further, devices or systems may be used or configured to perform logical functions presented in FIG. 9. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. The method shown in FIG. 9 may include one or more operations, functions, or actions as illustrated by one or more of blocks. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, some blocks or portions of some blocks may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, some blocks or portions of blocks in FIG. 9, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes electronically scanning respective volumes around the aircraft 100 using a virtual aperture radar system 102 including a plurality of antennas 104a-d relationally positioned on one or more surfaces of the aircraft 100 such that individual beams from each of the plurality of antennas 104a-d scan the respective volumes around the aircraft 100, and the respective volumes together substantially form an ellipsoidal field of regard 114 around the aircraft 100.

In examples where the block 202 takes the form of executable instructions, which when executed by the computing device 106 causes the computing device 106 to perform functions of block 202, such functions include causing the plurality of antennas 104a-d to electronically scan the respective volumes around the aircraft 100.

In one example, block 202 includes electronically scanning respective volumes using the plurality of antennas 104a-d to scan at the same time. In another example, block 202 includes electronically scanning respective volumes using at least four radar antennas, where a first radar antenna is positioned to face downward on the aircraft 100, a second radar antenna is positioned to face upward on the aircraft 100, a third radar antenna is positioned to face forward on the aircraft 100, and a fourth radar antenna is positioned to face rearward on the aircraft 100.

In another example, block 202 includes electronically scanning such that the aircraft 100 is at a center of the ellipsoidal field of regard 114, and the horizontal diameter 124 of the ellipsoidal field of regard 114 is larger than the vertical diameter 126 of the ellipsoidal field of regard 114.

In another example, block 202 includes electronically scanning such that the ellipsoidal field of regard 114 provides a coverage area including the vertical diameter 126 of at least 4000 feet and the horizontal diameter 124 having a range of at least 5 nautical miles centered on the aircraft.

In another example, block 202 includes electronically scanning such that the ellipsoidal field of regard 114 is an oblate-spheroid coverage area. The oblate-spheroid coverage are may be obtain by rotating the ellipse about one of its axes.

At block 204, the method 200 includes combining, by the computing device 106, the respective volumes together to form an image representative of the ellipsoidal field of regard 114 around the aircraft 100.

Within examples, the computing device 106 receives outputs of the plurality of antennas 104a-d, and stitches together a four dimensional image of a coverage area surrounding the aircraft 100 for avoidance algorithms to assess. Thus, a sequence of scans taken by the plurality of antennas 104a-d at short intervals on the moving aircraft can be stitched together to create an image that looks like a single scan from a large antenna. The virtual aperture radar system 102 has the plurality of antennas 104a-d scanning at the same time, and such scans are stitched together resulting in an image that imitates a single large antenna scan.

Many different synthetic aperture radar (SAR) algorithms can be used, and one example includes defining a three-dimensional array (or volume) of an area, and elements of the array are cubical voxels representing a density of a reflective surface being at that location in space. Then for each captured waveform or scan, the entire volume is iterated. For a given waveform and voxel, a distance from a position represented by that voxel to the antenna(s) used to capture that waveform is calculated. The distance represents a time delay into the waveform, and a sample value at that position in the waveform is then added to the voxel's density value. This represents a possible echo from a target at that position. After all waveforms have been iterated over all voxels, the basic SAR processing is complete. What remains is to decide what voxel density value represents a solid object. Voxels whose density is below a threshold are ignored. The threshold level chosen can be higher than a peak energy of any single wave so that the wave peak does not appear as a sphere of false density across the entire volume. The voxels that passed the threshold criteria are visualized in 2D or 3D images.

The function of the computing device 106 combining the respective volumes together to form the image representative of the ellipsoidal field of regard 114 around the aircraft 100 can be fully performed by the aircraft 100. In this manner, the aircraft 100 can be operated fully autonomously with no ground or radio support required, and thus, the aircraft 100 can be operated in areas where there is no radio coverage.

In addition, the function of the computing device 106 combining the respective volumes together to form the image representative of the ellipsoidal field of regard 114 around the aircraft 100 is performed on a continuous basis so as to continually update the image representative of the ellipsoidal field or regard 114 around the aircraft 100 as new scans are completed. Thus, the method 200 is performed in real-time as the new scans are made by the plurality of antennas 104a-d and subsequently provided to the computing device 106.

At block 206, the method 200 includes identifying, by the computing device 106, one or more objects within the image. In example operations, some UAS are required to operate below 400 feet, and some UAMs and CAVs are also expected to operate at low level and to land and take off vertically at minimally controlled or uncontrolled landing sites. Operating at low levels means that the UAS/UAM/CAVs will often be in radar shadows or hidden by permanent echoes. Typically, at low levels air traffic control services will be withheld as the controllers cannot be sure that they will keep radar contact with the aircraft nor can controllers be sure that other aircraft operating below the UAS/UAM/CAVs and in conflict, will be visible even on active and cooperative displays. Therefore, the internal autonomous surveillance carried on board the aircraft itself is required to identify objects within the image.

In addition, vertical descent to land and vertical takeoff both require that the UAS/UAM/CAVs can clear airspace around, below, and above the aircraft. To do so, the on board radar with an oblate-spheroid/ellipsoid scan is used to detect non-cooperative targets above, below, and around the aircraft 100.

In further examples, the method 200 includes autonomously controlling operation of the aircraft 100, by the computing device 106, based on the one or more objects identified within the image. The autonomous control of the aircraft 100 helps the aircraft 100 avoid hazards based on a proximity or predicted proximity of the one or more objects detected in the ellipsoidal coverage area.

In further examples, the method 200 includes autonomously controlling operation of the aircraft 100, by the computing device 106, during a vertical descent to land and during a vertical takeoff based analysis of airspace below and above the aircraft using the image representative of the ellipsoidal field of regard 114 around the aircraft 100.

Utilizing an ellipsoidal field of regard overcomes prior limitations of detecting non-cooperative conflicting aircraft that rely on radar with a shallow field of regard. The ellipsoidal field or regard as described herein also enables vertical and/or short takeoff and landing (VSTOL) UAM aircraft to be able to clear the airspace above and below the 'own-ship' as their flight departures and arrivals are mostly vertical and not forward flight.

Examples described herein provide the ellipsoidal radar coverage required by UAS/UAM/CAV for detection and avoidance processes by placing multiple small low SWaP conformal or flat plate electronically scanning radar antennae on the surfaces of the aircraft in sufficient number and in positions to provide a fully scanned ellipsoid around the aircraft. The ellipsoidal radar coverage area enables safe operation autonomously as required. With many UAM aircraft being vertical and/or short takeoff and landing (VSTOL) aircraft, flights will be at or near vertical and a more complete scan vertically above and below the UAM aircraft is needed for landing and taking off.

In addition, providing the antennas on the aircraft enables the aircraft to autonomously detect other objects rather than relying on ground communications from other radar, for example.

In an example use case, UAM, UAV, or CAV aircraft generally will be flying close to each other and at elevation not monitored by air traffic control. An example separation between such aircraft may be about 3 miles apart, or for urban areas, even closer together. In addition, such aircraft fly at low levels, such as at about 400 feet, and in a populated area, there may be several hundred to several thousand flying objects in this area within airspace that is not controlled airspace. As such, the UAM/UAV/CAV will land and take off and flying through areas in which many cooperative or non-cooperative aircraft are present. Thus, because these aircraft will not have access to ground based radar or other typical air traffic control communications, and the aircraft typically do not include any pilot, the aircraft can utilize examples described herein to obtain a full ellipsoidal field of regard coverage area around the aircraft. The ellipsoidal field of regard is obtain autonomously by the aircraft, and can include a coverage area of about 7-10 miles ahead (when flying 200 mph) and 2000 feet above and below for takeoff and landing. Then, the aircraft can identify non-cooperative aircraft and can be operated safely and autonomously to maneuver in the crowded airspace.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An autonomous or remotely piloted aircraft, comprising:
    a virtual aperture radar system including a plurality of antennas relationally positioned on one or more surfaces of the aircraft such that individual beams from each of the plurality of antennas scan respective volumes around the aircraft, and the respective volumes together substantially form an ellipsoidal field of regard around the aircraft, wherein the aircraft is at a center of the ellipsoidal field of regard, and wherein a horizontal diameter of the ellipsoidal field of regard is larger than a vertical diameter of the ellipsoidal field of regard; and
    a computing device having one or more processors configured to execute instructions stored in memory for performing functions of:
        modifying power provided to the plurality of antennas based on operation of the aircraft in flight to increase the horizontal diameter of the ellipsoidal field of regard;
        modifying the power provided to the plurality of antennas based on operation of the aircraft during descent to decrease the vertical diameter of the ellipsoidal field of regard;
        combining the respective volumes together to form an image representative of the ellipsoidal field of regard around the aircraft; and
        identifying one or more objects within the image.

2. The autonomous or remotely piloted aircraft of claim 1, wherein the plurality of antennas are configured to scan at the same time.

3. The autonomous or remotely piloted aircraft of claim 1, wherein at least some of the plurality of antennas include low Size Weight and Power (SWaP) antennas.

4. The autonomous or remotely piloted aircraft of claim 1, wherein at least some of the plurality of antennas include conformal or flat antennas.

5. The autonomous or remotely piloted aircraft of claim 1, wherein the plurality of antennas includes at least four radar antennas, wherein a first radar antenna is positioned to face downward on the aircraft, a second radar antenna is positioned to face upward on the aircraft, a third radar antenna is positioned to face forward on the aircraft, and a fourth radar antenna is positioned to face rearward on the aircraft.

6. The autonomous or remotely piloted aircraft of claim 1, wherein the plurality of antennas have fixed positions on the one or more surfaces of the aircraft, and wherein the plurality of antennas are configured to electronically scan the respective volumes.

7. The autonomous or remotely piloted aircraft of claim 1, wherein the ellipsoidal field of regard is an oblate-spheroid coverage area.

8. The autonomous or remotely piloted aircraft of claim 1, wherein the ellipsoidal field of regard provides a coverage area including a vertical diameter of at least 4000 feet and a horizontal diameter having a range of at least 5 nautical miles centered on the aircraft.

9. The autonomous or remotely piloted aircraft of claim 1, wherein the one or more processors are further configured to execute the instructions stored in memory for performing a function of:
    autonomously controlling operation of the aircraft based on the one or more objects identified within the image.

10. The autonomous or remotely piloted aircraft of claim 1, wherein the one or more processors are further configured to execute the instructions stored in memory for performing a function of:
    autonomously controlling operation of the aircraft during a vertical descent to land and during a vertical takeoff based on analysis of airspace below and above the aircraft using the image representative of the ellipsoidal field of regard around the aircraft.

11. A method of radar surveillance on-board an autonomous or remotely piloted aircraft, the method comprising:
    electronically scanning respective volumes around the aircraft using a virtual aperture radar system including a plurality of antennas relationally positioned on one or more surfaces of the aircraft such that individual beams from each of the plurality of antennas scan the respective volumes around the aircraft, and the respective volumes together substantially form an ellipsoidal field of regard around the aircraft, wherein the aircraft is at a center of the ellipsoidal field of regard, and wherein a horizontal diameter of the ellipsoidal field of regard is larger than a vertical diameter of the ellipsoidal field of regard;
    modifying power provided to the plurality of antennas based on operation of the aircraft in flight to increase the horizontal diameter of the ellipsoidal field of regard;
    modifying the power provided to the plurality of antennas based on operation of the aircraft during descent to decrease the vertical diameter of the ellipsoidal field of regard;
    combining, by a computing device, the respective volumes together to form an image representative of the ellipsoidal field of regard around the aircraft; and
    identifying, by the computing device, one or more objects within the image.

12. The method of claim 11, wherein electronically scanning respective volumes around the aircraft using the plurality of antennas comprises electronically scanning respective volumes using the plurality of antennas to scan at the same time.

13. The method of claim 11, wherein electronically scanning respective volumes around the aircraft using the plurality of antennas comprises electronically scanning respective volumes using at least four radar antennas, wherein a first radar antenna is positioned to face downward on the aircraft, a second radar antenna is positioned to face upward on the aircraft, a third radar antenna is positioned to face forward on the aircraft, and a fourth radar antenna is positioned to face rearward on the aircraft.

14. The method of claim 11, wherein electronically scanning respective volumes around the aircraft and the respective volumes together substantially form the ellipsoidal field of regard around the aircraft comprises electronically scanning such that the ellipsoidal field of regard is an oblate-spheroid coverage area.

15. The method of claim 11, wherein electronically scanning respective volumes around the aircraft and the respective volumes together substantially form the ellipsoidal field of regard around the aircraft comprises electronically scanning such that the ellipsoidal field of regard provides a coverage area including a vertical diameter of at least 4000 feet and a horizontal diameter having a range of at least 5 nautical miles centered on the aircraft.

16. The method of claim 11, further comprising:
autonomously controlling operation of the aircraft, by the computing device, based on the one or more objects identified within the image.

17. The method of claim 11, further comprising:
autonomously controlling operation of the aircraft, by the computing device, during a vertical descent to land and during a vertical takeoff based analysis of airspace below and above the aircraft using the image representative of the ellipsoidal field of regard around the aircraft.

18. A non-transitory computer-readable media having stored therein executable instructions, which when executed by a computing device having one or more processors causes the computing device to perform functions comprising:
causing a plurality of antennas relationally positioned on one or more surfaces of an aircraft to electronically scan respective volumes around the aircraft such that individual beams from each of the plurality of antennas scan the respective volumes around the aircraft, and the respective volumes together substantially form an ellipsoidal field of regard around the aircraft, wherein the aircraft is at a center of the ellipsoidal field of regard, and wherein a horizontal diameter of the ellipsoidal field of regard is larger than a vertical diameter of the ellipsoidal field of regard;

modifying power provided to the plurality of antennas based on operation of the aircraft in flight to increase the horizontal diameter of the ellipsoidal field of regard;

modifying the power provided to the plurality of antennas based on operation of the aircraft during descent to decrease the vertical diameter of the ellipsoidal field of regard;

combining the respective volumes together to form an image representative of the ellipsoidal field of regard around the aircraft; and identifying one or more objects within the image.

19. The autonomous or remotely piloted aircraft of claim 1, wherein the one or more processors are further configured to execute the instructions stored in memory for performing a function of:
modifying the power provided to the plurality of antennas based on operation of the aircraft during descent so that the vertical diameter of the ellipsoidal field of regard is modified to be larger above the aircraft than below the aircraft.

20. The method of claim 11, further comprising:
modifying, by the computing device, the power provided to the plurality of antennas based on operation of the aircraft during descent so that the vertical diameter of the ellipsoidal field of regard is modified to be larger above the aircraft than below the aircraft.

* * * * *